UNITED STATES PATENT OFFICE.

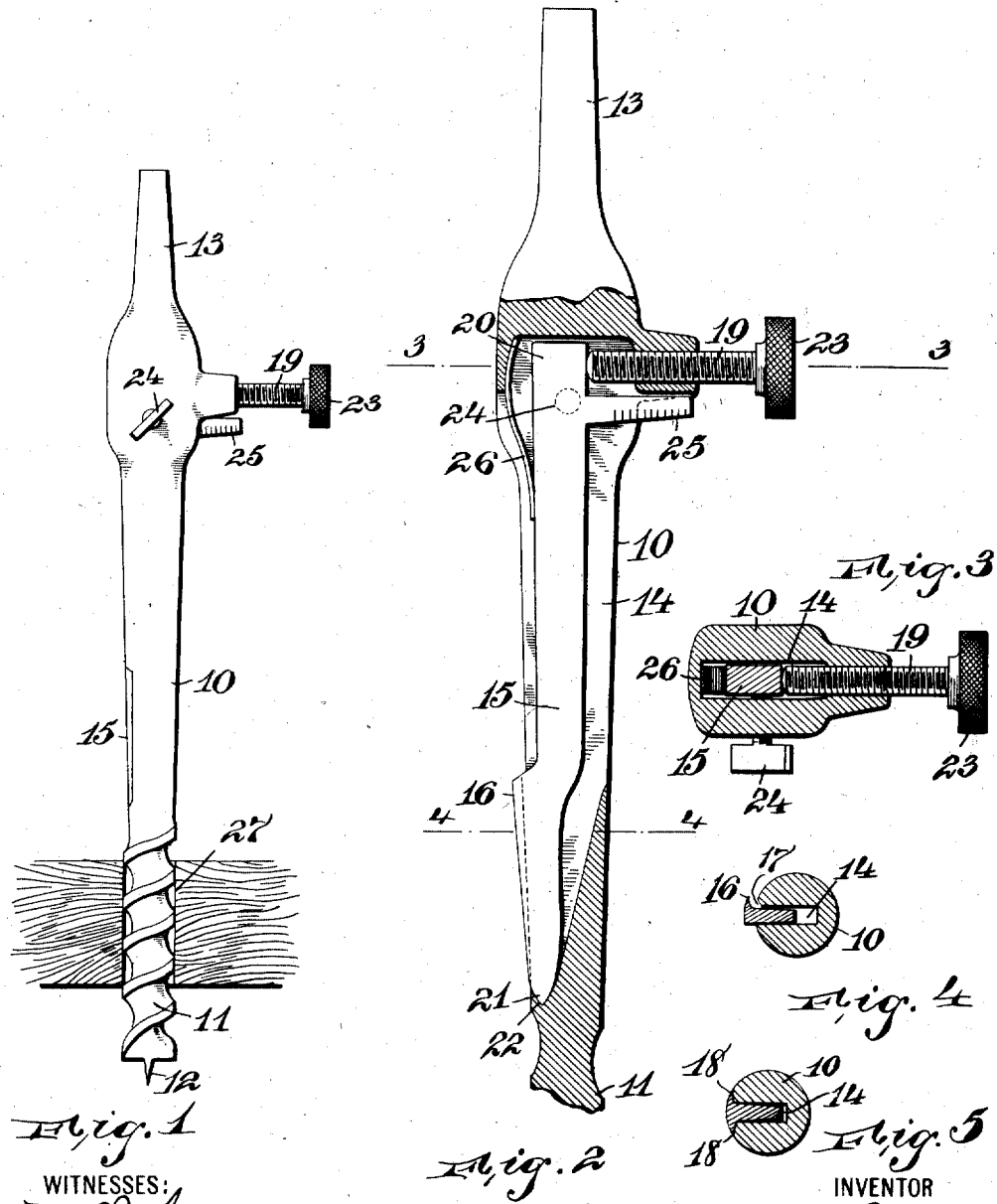

FRANCESCO ANTONIO PICA, OF NEWARK, NEW JERSEY.

BIT.

1,008,363.  Specification of Letters Patent.  Patented Nov. 14, 1911.

Application filed July 27, 1911.  Serial No. 640,785.

*To all whom it may concern:*

Be it known that I, FRANCESCO ANTONIO PICA, a citizen of the United States, residing at Newark, in the county of Essex and State of New Jersey, have invented certain new and useful Improvements in Bits; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a bit or auger which is adapted to bore holes of different diameters and to also bore a hole with a countersunk portion. The bit is provided with a main boring portion of any type which drills or bores a hole and then acts to hold the bit so that the adjustable cutter cuts or bores a larger hole concentric with the previously bored hole. The adjustable cutter is mounted above the main boring portion and is actuated by an adjusting mechanism so as to project from the bit-stock any desired distance. A holding means may be provided for securing the adjustable cutter in any of its different positions, the cutter when in its normal position being entirely within the bit-stock so as to not interfere with the main boring portion. The adjustable cutter is provided with a scale for indicating the size of the hole it will bore, and is preferably returned to its normal position by a spring.

The invention is illustrated in the accompanying drawing, in which—

Figure 1 is a side view of my improved bit. Fig. 2 is a vertical section of the upper portion thereof. Fig. 3 is a section on line 3, 3, in Fig. 2. Fig. 4 is a section on line 4, 4, in Fig. 2, and Fig. 5 is a view similar to Fig. 4 but of a modified form of cutter.

The bit consists of a bit-stock 10 which is provided at its bottom end with a main boring portion 11 which may be of any of the usual types used in bits and augers, but shown in the illustration as one of the spiral type with a centering or guiding tip 12. At its top the bit is provided with a finger 13 for its attachment to a brace or other turning mechanism which is not shown. The bit-stock is slotted as at 14 so as to permit the swinging cutter-plate 15 to move within the stock. The cutter is provided with a cutting edge 16, which, when the cutter is in its normal position, fits within the cut-away portion 17 of the stock 10. The cutter may be provided with two cutting edges 18, as in Fig. 5, so that the bit can be used right or left-handed. A screw 19 is arranged in the stock 10 and abuts on the top end 20 of the cutter 15 and acts to force the cutter to swing on its end 21 in the pocket 22 of the stock, when the finger-piece 23 of the screw 19 is turned. A set-screw 24 is arranged in the stock and can be screwed in to engage the cutter 15 and bind it in its place so that if the screw 19 retreats the cutter is held in place. The cutter has a nose 25 which has a scale thereon which indicates at a suitable place, as the edge of the stock, the diameter of the hole the cutter is adjusted to cut. The spring 26 bears on the stock and on the cutter to force the cutter to its normal position when it is free to swing.

The disposition of the adjustable cutter between the main boring portion 11 of the bit and the attaching means or end 13, while it places the cutter in a convenient and accessible position, also gives it the advantage of being held centered or concentric to a hole 27 bored by the main boring portion 11. With an ordinary extension bit, when a hole previously bored is to be enlarged, the placing of the bit in a concentric position to the hole is mainly by guess work and the bit, at the beginning of the enlarged boring, has no bearing in the hole.

Having thus described my invention, what I claim is:—

1. A bit comprising a stock having a cutter-plate pivoted at its bottom in the stock and adapted to swing therein, a spring for normally holding the cutter-plate within the stock, and a screw in the stock and bearing on the cutter-plate for forcing the cutter-plate to project from the stock.

2. A bit comprising a stock with a boring portion at the bottom and having a slot above the boring portion, a cutter-plate swinging in the slot, the cutter-plate being in pivotal relation with the stock at the bottom of the cutter-plate, a screw in the stock and bearing on the cutter to force the cutter from the stock, a spring bearing on the stock and on the cutter-plate to force the cutter-plate to its normal position, and a nose on the cutter having a scale thereon.

3. A bit comprising a stock with a boring portion at the bottom, the stock having a slot therein above the boring portion, the slot having a pocket in the bottom, a cutter-plate with a nose to enter the pocket and having a cutting edge adapted to be projected from the stock when the cutter-plate is swung, a spring tending to normally force the cutter-plate within the stock, a screw in the stock and bearing on the cutter-plate to force the cutter-plate from the stock, and a set-screw in the stock at right-angles to the swinging movement of the cutter, said set-screw being adapted to lock the cutter in its adjusted positions.

In testimony that I claim the foregoing, I have hereunto set my hand this 25th day of July, 1911.

FRANCESCO ANTONIO PICA.

Witnesses:
WM. H. CAMFIELD,
WILLIAM DANTON.

Copies of this patent may be obtained for five cents each, by addressing the "Commissioner of Patents, Washington, D. C."